United States Patent [19]

Kamm et al.

[11] 4,134,824
[45] Jan. 16, 1979

[54] INTEGRATED PROCESS FOR THE PARTIAL OXIDATION-THERMAL CRACKING OF CRUDE OIL FEEDSTOCKS

[75] Inventors: Gerard R. Kamm, S. Charleston, W. Va.; Kazuo Tanaami, Yokohama, Japan

[73] Assignee: Union Carbide Corporation, New York, N.Y.

[21] Appl. No.: 804,223

[22] Filed: Jun. 7, 1977

[51] Int. Cl.² .............................................. C10G 9/36
[52] U.S. Cl. ........................................ 208/92; 48/215; 208/129; 260/683 R
[58] Field of Search ..................... 208/129, 130, 92; 48/197 R, 212, 215; 260/683 R

[56] References Cited

U.S. PATENT DOCUMENTS

| | | | |
|---|---|---|---|
| 2,371,147 | 3/1945 | Burk | 208/129 |
| 2,698,830 | 1/1955 | Jenny | 208/129 |
| 3,565,970 | 2/1971 | Kelley | 208/130 |

OTHER PUBLICATIONS

Hosoi et al., "Chemical Engineering Progress" 71, No. 11, Nov. 1975 pp. 63 to 67.

Primary Examiner—Herbert Levine
Attorney, Agent, or Firm—Gerald R. O'Brien, Jr.

[57] ABSTRACT

An integrated partial oxidation-thermal cracking process is disclosed for the more complete utilization of all chemical values in crude oil feedstocks employed in the concurrent production of synthesis gas and an olefin-rich stream comprising the steps of: burning, at a high temperature, streams of fuel and oxygen in the presence of superheated steam to form a reducing stream of hot combustion products; injecting a crude oil distillate fraction stream into said reducing stream of hot combustion products; passing the resulting injected stream to a reaction zone to effect thermal cracking of said crude oil distillate fraction steam and reaction products; thermally quenching said stream; removing pitch and fractionating to provide at least one stream of hydrocarbon oil and an olefin rich gas stream; separating carbon dioxide and any contained hydrogen sulfide from said olefin rich gas stream; separating streams of synthesis gas, methane and ethylene from said olefin rich gas stream; and recycling fractions of said methane stream as fuel to said burning step.

5 Claims, 3 Drawing Figures

INTEGRATED PROCESS FOR THE PARTIAL OXIDATION-THERMAL CRACKING OF CRUDE OIL FEEDSTOCKS

The present invention relates to an integrated process for the partial oxidation-thermal cracking of crude oil feedstocks. More particularly, the integrated process relates to the more complete utilization of all chemical values in crude oil feedstocks employed in the concurrent production of synthesis gas and high yields of desired olefins.

The Partial Oxidation (PO) process involves an intimate coupling of several complex chemical reactions which produce synthesis gas (CO and $H_2$). The partial oxidation reaction mechanism involves exothermic, partial combustion of a portion of a hydrocarbon feed which supplies heat to the endothermic steam cracking of the balance of the feed. Besides carbon monoxide, hydrogen, carbon dioxide, hydrogen sulfide, and other trace impurities, partial oxidation produces soot in non-equilibrium amounts. The composition of the products, particularly $H_2/CO$ ratio, sulfur, and soot, are generally determined by the type of feedstock, the oxygen/fuel ratio and the amount of steam used. For example, residual feedstocks (i.e., the residue or material remaining after distillation) normally provide a $CO/H_2$ ratio near unity while soot formation roughly corresponds to 1-3% of the carbon content of the feedstock and is a function of the H/C ratio of the feed and O/C ratio in the burner. All things being equal the higher these ratios the less soot is produced. The term "soot" refers to carbon particles which are submicron in size and may form agglomerates.

Such partial oxidation processes are in wide commercial use. There are no basic differences between these processes in the production of synthesis gas. They differ significantly, however, in the downstream purification, heat, and carbon recovery steps. Such processes generally operate at pressures ranging from 15-88 atmospheres (about 1300 psig) and at temperatures in the range from 1200°-1500° C. Some such processes operate on residual feedstocks.

Because soot represents a loss of 1-3% of the carbon value of the feedstock, it is typically recovered in a water wash system and recycled to the burner. Some such processes are explicit in requiring soot formation to sequester the ash (consisting mainly of metal oxides) formed from residual feedstocks. It is believed that the soot scrubbing water wash leaches out the soluble components of the ash. These water soluble compounds are then removed in the blowdown water.

In another process, crude oil feedstock values are converted by a thermal cracking reaction mechanism to reaction products high in olefins. One such process is the so-called "Advanced Cracking Reaction" (ACR) process. Superheated steam is generated by the burning of oxygen and fuel (usually $H_2$ and/or $CH_4$) to produce combustion gases of about 2000° C. This is supplemented by superheated steam generated externally from the reaction zone. The combined streams form the so-called "heat carrier" or steam cracking medium. Downstream from the burner, crude oil distillates are injected into this high temperature stream and rapidly vaporize. The vaporized feedstock and combustion gases are accelerated through an orifice or throat into the diffuser or reaction chamber where the adiabatic cracking occurs in 10-20 milliseconds residence time. The steam and reaction products are rapidly quenched and then cooled in a unique wetted-wall heat exchanger which generates high pressure steam. A gas-liquid phase separation takes place, pitch being discharged and the vapor going to the gasoline fractionator which is followed by compression and acid gas removal. This results in an olefins rich stream containing ethylene, acetylene, propylene, and the other cracking by-products.

Typical burner temperatures and pressures on the order of 2000° C. and 100 psia are used to give reactor outlet conditions of roughly 900° C. and 40–50 psig. The product mix or yield pattern depends upon the severity of the crack, the characteristics of the feedstock being used, the mixing efficiency of feedstock and carrier gas, and the residence time.

Figure 1:
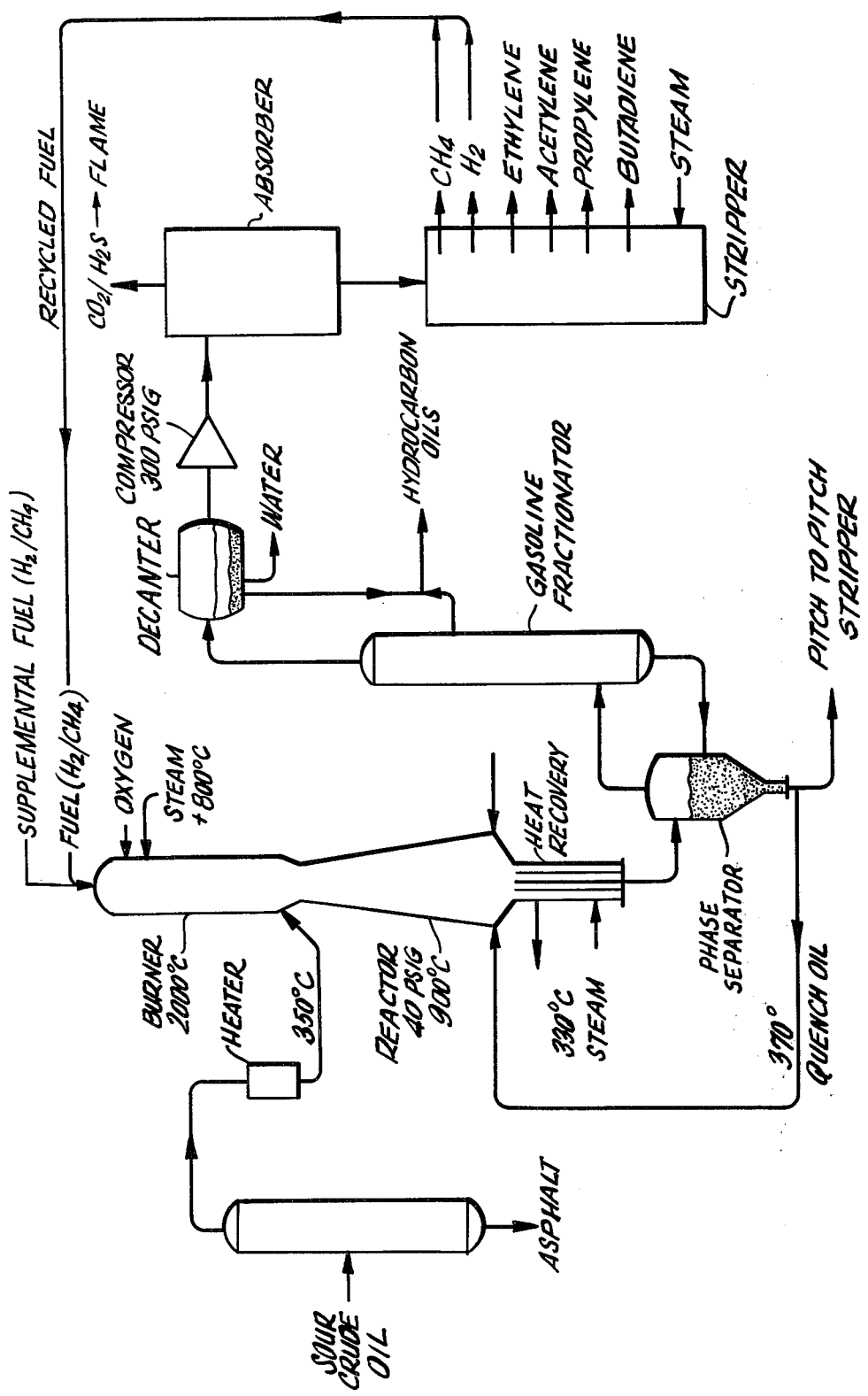
FIG. 1 is a schematic flow sheet of an ACR reaction and separation process.

It has been found by examination of the individual PO process and the ACR process, which latter is exemplified in the embodiment of FIG. 1 of the drawings, that both consist of essentially the same process elements, i.e. combustion, reaction, quench, heat recovery, and product purification. The different end products then, to a large extent, are a result of the different feedstocks and their utilization in the two processes.

Both feedstocks are contained in whole crude. More specifically, the ACR uses the top of the barrel, the distillate fraction, while the bottoms or residual fraction may be used as the PO feedstock. Together, both processes can be balanced to utilize 100% of the crude oil barrel. The other obvious difference in the two processes is the region into which the feedstock is introduced. The PO feedstock is supplied to the combustor providing the exothermic heat for synthesis gas generation. The ACR feedstock is injected into the high temperature carrier gas which supplies the heat required for the endothermic cracking of hydrocarbons to olefins.

These interesting, yet fortunate, differences lend themselves to the unique possibility of integrating the two processes. In fact, the situation is thermodynamically ideal, because integration results in the transfer of heat between the two processes at high temperatures without an intermediary fluid or processing equipment.

Figure 2:
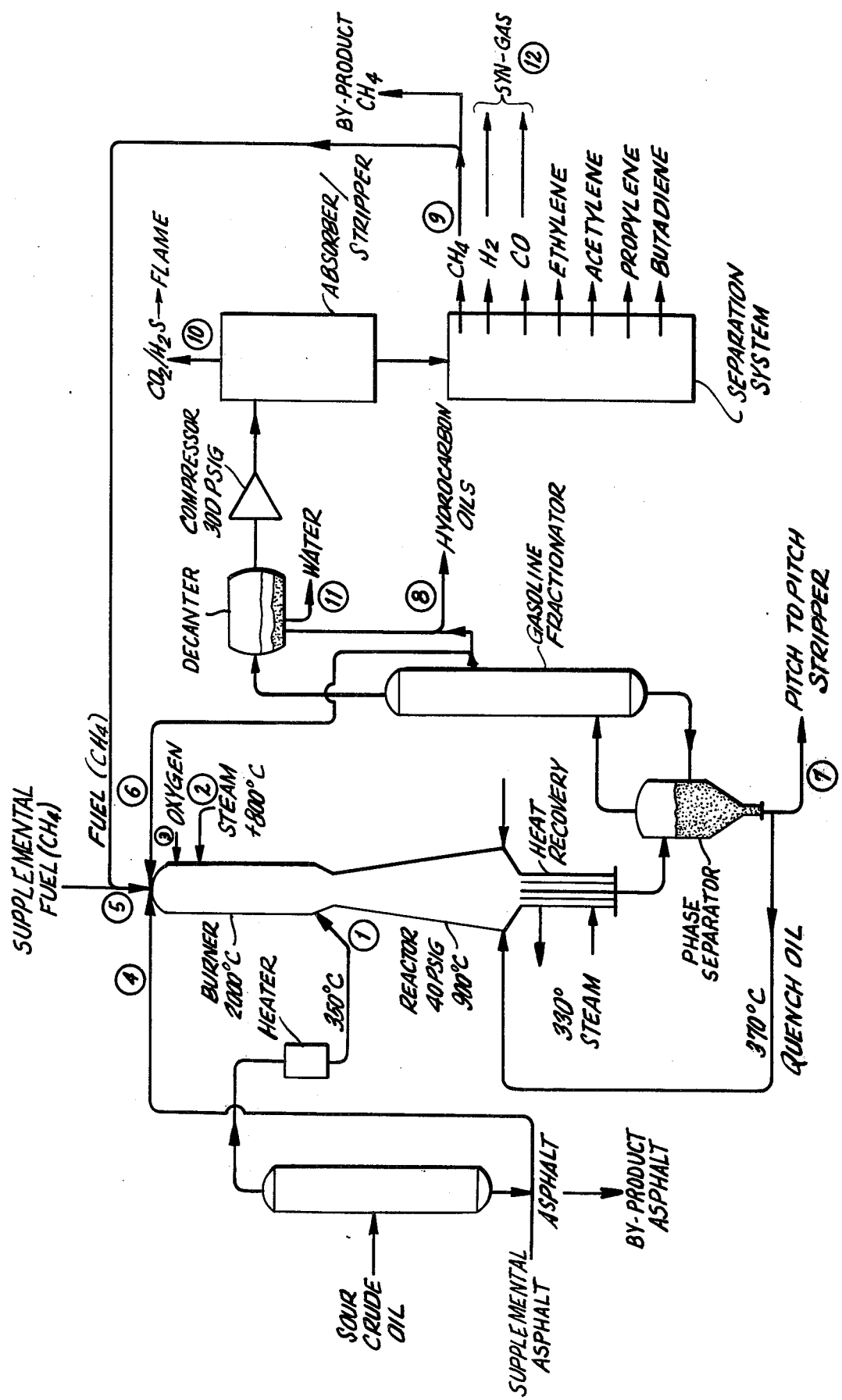
FIG. 2 is a schematic flow sheet of a reaction and separation process embodying the present invention.

The integration of the PO and ACR processes has been found to require increased size fractionator, acid gas system, compression system and methane column to accommodate the non-condensable gases. An additional separation system is employed for the separation of hydrogen-methane-carbon monoxide. The schematic flow sheet of FIG. 2 shows one such embodiment of an integrated PO-ACR process.

In accordance with the present invention, an integrated partial oxidation-thermal cracking process provided for the more complete utilization of all chemical values in crude oil feedstocks employed in the concurrent production of synthesis gas and an olefin-rich stream comprising the steps of: burning, at a high temperature, streams of fuel and oxygen in the presence of superheated steam to form a reducing stream of hot combustion products; injecting a crude oil distillate fraction stream into said reducing stream of hot combustion products; passing the resulting injecting stream to a reaction zone to effect thermal cracking of said crude oil distillates fraction steam and reaction products; thermally quenching said stream; removing pitch and fractionating to provide at least one stream of hydrocarbon oil and an olefin rich gas stream; separating carbon dioxide and any contained hydrogen sulfide from said olefin rich gas stream; separating streams of synthesis gas, methane and ethylene from said olefin rich gas stream; and recycling said methane stream as fuel to said burning step.

Any one or blends of a wide variety of crude oils may be employed as the feedstock for the process of the present invention. In the embodiment of the process shown in the flowsheet of FIG. 2 of the drawings, a sour crude oil is employed, whereby the contained sulfur values are removed in the absorber/stripper stage as hydrogen sulfide. When employing domestic crude oils of low contained sulfur, substantially no hydrogen sulfide will be produced at the absorber/stripper.

The preferred temperature maintained at the exit of the reaction zone has been found to be about 900° C. It has been found preferable to maintain a pressure in the reaction zone of about 40 psig. Preferred residence time for passing the injected stream through the velocity accelerating and reaction zones is from about 10–20 milliseconds.

It has been found that the fuel/oxidant ratio (by weight) may vary over a range of from about 0.3–1.0 to 1 and still provide the necessary reducing gases in the hot gaseous combustion product stream produced in the burning step. A fuel/oxidant ratio of about 0.4 to 0.8 is preferred.

The quenching step in the embodiment of the process of FIG. 2 of the drawings is carried out employing pitch-containing oil recycled from the pitch phase separator and injected as a plurality of streams into the thermally cracked reaction product stream. The quenching oil may, however, be any other relatively heavy oil. Water or low temperature steam may alternatively be employed as the quenching fluid.

While the process of the present invention requires the recycling of the reaction product component methane gas stream as a fluid fuel to the burning step, it has been found preferable to effect the recycling of other fluid fuel streams to the burning step to assist in formation of the initial hot gaseous combustion product stream. Thus, liquid fractions of distilled hydrocarbon oil are preferably recycled as fluid fuel to the burning step and the asphaltic fraction resulting from the separation treatment of crude oil is also recycled as fuel to the burning step.

Accordingly, in the preferred embodiment of the invention, the process comprises the steps of:
 (a) separating, by distillation, a crude oil feedstock stream into distillate and asphaltic streams;
 (b) burning, at a temperature of about 1800°–2000° C., streams of fluid fuel and oxygen having a weight ratio of about 0.6 to 1 in the presence of superheated steam to form a stream of hot combustion products;
 (c) passing said asphaltic stream as fluid fuel to said burning step (b);
 (d) injecting said crude oil distillate fraction stream into said stream of hot combustion products.
 (e) passing the resulting injected stream through a velocity accelerating zone to a reaction zone maintained at an exit temperature of about 800°–1000° C. and a pressure of about 10–150 psig for 5–50 milliseconds to effect thermal cracking of said crude oil distillate fraction stream to a stream containing steam and reaction products;
 (f) thermally quenching said steam and reaction products stream;
 (g) removing pitch from said stream and fractionating the resulting stream to provide at least one stream of hydrocarbon oil and an olefin rich gas stream.
 (h) recycling fractions of said hydrocarbon oil stream as fluid fuel to said burning step (b);
 (i) separating carbon dioxide and any contained hydrogen sulfide from said olefin rich gas stream;
 (j) separating streams of synthesis gas, methane, acetylene, ethylene, propylene and other cracking by-products from said olefin rich gas stream; and
 (k) recycling said methane stream as fuel to said burning step (b).

The ACR process is based on burning gaseous fuel and pure oxygen to produce a high temperature heat carrier consisting primarily of carbon dioxide and water and using this heat carrier to thermally crack a hydrocarbon feed. The effluent from the reactor is cooled and the products separated. A flowsheet of the process is shown in FIG. 1 of the drawings.

The ACR process arrangement necessitated the separation of large amounts of carbon dioxide from the reaction products. This separation is costly and, once separated, the carbon dioxide is of little or no commercial value. Calculations (see Table I below) of the flame composition of the burner products made using an equilibrium model show that, if the burner is operated with a large excess of gaseous fuel, the amount of carbon oxides produced can be reduced to a small fraction of that achieved when using a near stoichiometric mixture of fuel and oxygen (equivalents ratio equals one). It has been found that operating the burner in the fuel-rich, partial oxidation mode, as shown in FIG. 2, also results in the formation of large amounts of carbon monoxide. Depending on the fuel composition, large amounts of hydrogen are also produced. These flue gases (hydrogen and carbon monoxide), commonly referred to as "Syn-gas" can be used to form the heat carrier in the ACR cracking of hydrocarbon feedstocks. Syn-gas also has a significant commercial value and can be recovered from the ACR reaction products and used in the manufacture of alcohols and ammonia. Furthermore, by carrying out the cracking reaction in the presence of significantly higher partial pressure of hydrogen, one can expect that significant increases in ethylene and other olefins yields might be obtained.

TABLE I

| | FUEL/OXIDANT AND $CO/CO_2$ RATIOS | |
|---|---|---|
| Fuel/Oxidant Weight Ratio | Flame Composition Mole Fraction $CO, CO_2, H_2$ | $CO/CO_2$ Ratio |
| 0.2252 | Stoichiometric to $CO_2$ + water | |
| 0.237 | 0.117, 0.132, 0.100 | 0.89 |
| 0.298 | 0.148, 0.100, 0.153 | 1.48 |
| 0.327 | 0.173, 0.076, 0.212 | 2.28 |
| 0.362 | 0.192, 0.057, 0.277 | 3.38 |
| 0.406 | 0.207, 0.042, 0.346 | 4.94 |
| 0.410 | Stoichiometric to CO + water | |
| Basis: | NASA Equilibrium Program | |
| | Pressure      2.9 atmospheres absolute | |
| | Temperature   2100° C | |
| | Fuel Composition   50% $CH_4$ | |
| | (Vol. %)      50% $H_2$ | |

Figure 3:
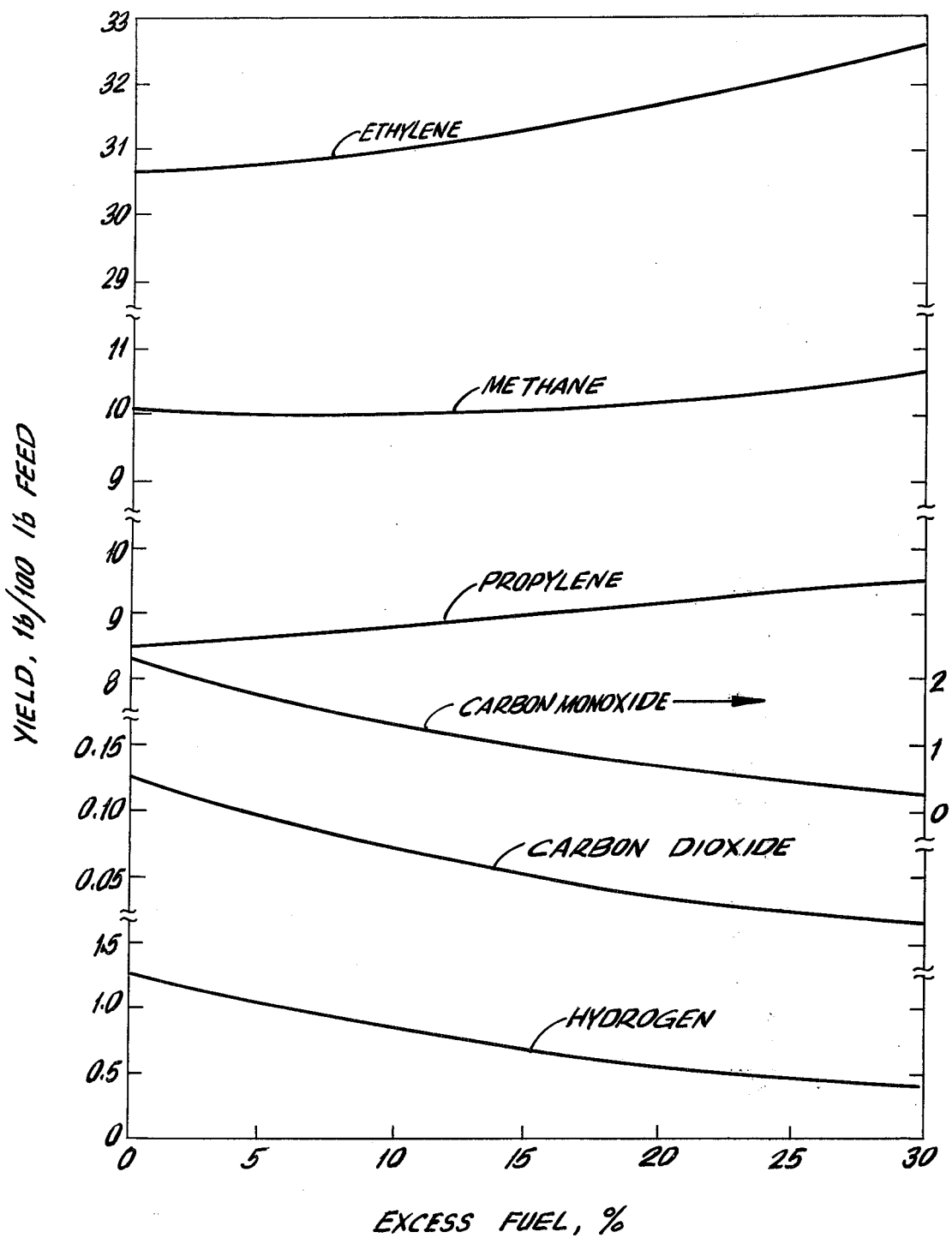
FIG. 3 is a graph setting forth the gas yield in components of reaction product as a function of fuel excess.

Data obtained to examine the effects of excess fuel are shown in FIG. 3. This work has shown that modest increases in the amount of hydrogen fuel can result in significant increases in the yields of ethylene and propylene. Since no carbon oxides are formed when hydrogen fuel is burned, one can also easily examine the yields of carbon oxides produced in the reactor. FIG. 3 shows that even the production of carbon dioxide in the reactor is reduced by operating the burner at successively higher levels of excess fuel.

Referring specifically to the flowsheet of FIG. 2 of the drawings, the process of the invention may be operated in a number of modes which permit the use of a wide variety of crude oil feedstocks and the production of a wide variety of by-products, depending on the mode employed.

In the following examples, two significantly differing feedstocks, Arab Light Crude and Brega Crude are employed. It is to be noted that, in operating modes where by-product asphalt is produced, it can be employed later in the conversion of other feedstocks where supplemental asphalt is required to maintain a material balance for the over-all process. Similarly, in some modes of operation with some feedstocks, by-product methane can be produced and stored for later employment in the conversion of other feedstocks where material balance considerations require supplemental methane.

In addition, the partial fueling of the burner of the process with recycled hydrocarbon oils (tar) can be employed in a given mode of operation of the process, or the oils may be employed totally in the production of gaseous products.

In examples of the process of the invention in varying modes of operation the crude oil feedstocks are set forth in Table II below. Feedstock (A) has a relatively lower API gravity, a much higher sulphur content and asphalt content.

TABLE II

| | (CRUDE OIL FEED) | |
|---|---|---|
| | Arab Light (A) | Brega (B) |
| API Gravity | 34.7 | 40.2 |
| C | 85.4 | 86.1 |
| H | 12.8 | 13.7 |
| S | 1.7 | 0.2 |
| N + Others | 0.1 | nil |
| Asphalt (+560° C) | 16.8 | 9.0 |

Upon separation of the distillate fraction from the asphaltic residue fraction, the properties and analysis data for both feedstocks (A) and (B) are set forward in Tables III and IV, respectively.

TABLE III

| | (DISTILLATE REACTOR FEED) | |
|---|---|---|
| | Arab Light (A) | Brega (B) |
| API Gravity | 41.1 | 41.7 |
| S | 1.2 | 0.0 |
| C | 85.3 | 85.8 |
| H | 13.5 | 14.2 |

TABLE III-continued

| | (DISTILLATE REACTOR FEED) | |
|---|---|---|
| | Arab Light (A) | Brega (B) |
| N + Others | nil | nil |

TABLE IV

| | (VACUUM RESIDUE) | |
|---|---|---|
| | Arab Light (A) | Brega (B) |
| Boiling Range, °C. | +560° | +560° |
| Fraction of Crude, Wt % | 16.8 | 9.0 |
| C/H, Wt Ratio | 8.36 | 8.4 |
| C, Wt % | 85.5 | 88.8 |
| H, Wt % | 10.2 | 10.6 |
| S, Wt % | 4.0 | 0.6 |
| N, Wt % | 0.3 | nil |
| API Gravity | 6.9 | 15.1 |

The following TABLE V sets forth data for six varying modes of operation of the process of the invention in comparison with the ACR process of the prior art. All modes employ a constant 100 pound per hour crude oil distillate feed. The stream numbers set forth in TABLE IV are as identified in the flow sheet of FIG. 2 of the drawings.

Run 1 is a control run showing balanced fuel stoichiometry of the ACR process of the prior art. It is to be noted that Syn-gas production is relatively low. The by-product methane production is balanced with the methane burner fuel requirements to effect the material balance for the over-all process. Asphalt is a by-product stream.

Run 2, and the remaining Runs 3-7, show varying modes of operation of the process of the invention. In Run 2, the burner is totally gas fired with recycled methane and some supplemental methane as fuel.

Run 3 shows the employment of two burner fuels, recycled methane gas, recycled hydrocarbon oil and a slight amount of supplemental methane gas.

Run 4 shows the employment of three burner fuels, recycled methane gas, recycled hydrocarbon oil, all of the asphalt from the crude and some supplmental asphalt. This Run employs a high fuel/oxygen ratio and exhibits high Syn-gas production together with a low hydrogen/carbon monoxide ratio.

Run 5 shows the employment of three burner fuels, wherein no supplemental asphalt is employed. The data exhibits medium production of Syn-gas and a medium hydrocarbon-carbon monoxide ratio.

Run 6 shows the employment of three burner fuels with some asphalt by-product being produced. The data exhibits low Syn-gas production and low hydrogen/carbon monoxide ratio.

Run 7 shows the employment of a low sulphur crude feedstock. Some supplemental asphalt was employed. The data exhibits high Syn-gas production and a low hydrogen/carbon monoxide ratio.

TABLE V (All Values in Pounds per Hour)

| Stream Nos. | | 1 | 2 | 3 | 4 | 5 | 6 | 7 | 8 | 9 | 10 | 11 | 12 |
|---|---|---|---|---|---|---|---|---|---|---|---|---|---|
| Run No. | Crude | Oil Feed | Steam to Burner | Oxygen to Burner | Asphalt to Burner | Methane to Burner | Tar to Burner | Pitch Product (+340° C) | Hydro-Carbon Oils | Methane Product | $H_2S$ and $CO_2$ | Water | Syn-gas** |
| 1A | 120 | 100 | 102.3 | 43.5 | 0 | 12.1* | 0 | 4.9 | 31.0 | 9.8 | 28.4 | 125.7 | 6.3 |
| 2A | 120 | 100 | 43.6 | 66.5 | 0 | 28.6 | 0 | 4.9 | 31.0 | 9.8 | 31.1 | 71.7 | 38.3 |
| 3A | 120 | 100 | 57.0 | 63.1 | 0 | 15.6 | 15.5 | 4.9 | 15.5 | 9.8 | 41.6 | 70.8 | 41.2 |
| 4A | 120 | 100 | 43.4 | 67.7 | 22.8 | 8.1 | 9.7 | 4.9 | 21.3 | 9.8 | 40.0 | 50.1 | 63.9 |
| 5A | 120 | 100 | 67.2 | 57.8 | 17.2 | 6.1 | 7.3 | 4.9 | 23.7 | 9.8 | 45.8 | 73.0 | 39.1 |
| 6A | 120 | 100 | 94.3 | 47.5 | 10.7 | 3.8 | 4.6 | 4.9 | 26.4 | 9.8 | 45.2 | 102.8 | 15.0 |

TABLE V-continued (All Values in Pounds per Hour)

| Stream Nos. | 1 | 2 | 3 | 4 | 5 | 6 | 7 | 8 | 9 | 10 | 11 | 12 |
|---|---|---|---|---|---|---|---|---|---|---|---|---|
| Run No. | Crude | Oil Feed | Steam to Burner | Oxygen to Burner | Asphalt to Burner | Methane to Burner | Tar to Burner | Pitch Product (+340° C) | Hydro-Carbon Oils | Methane Product | H₂S and CO₂ | Water | Syn-gas** |
| 7B | 110 | 100 | 56.2 | 66.7 | 19.2 | 6.9 | 8.2 | 3.9 | 16.5 | 11.1 | 46.4 | 65.3 | 47.0 |

A - Arab Distillate.
B - Brega Distillate.
* - Contains 9.8 lbs $CH_4$, 1.2 lbs CO, 0.3 lbs $C_2H_4$, 0.8 lbs $H_2$.
** - Assumes quantitative separation of $H_2$ and CO from other products.

TABLE VI sets forth the gaseous products data for each of the seven runs of Table V. Also set forth are the Syn-gas weight and various ratios data for each of the runs.

TABLE VI (Pounds per Hour per 100 Pounds/Hour Reactor Feed)

| Run No. | 1 | 2 | 3 | 4 | 5 | 6 | 7 |
|---|---|---|---|---|---|---|---|
| $H_2$ | 0.7 | 4.9 | 4.3 | 5.1 | 4.0 | 2.3 | 3.5 |
| CO | 3.6 | 33.4 | 36.9 | 58.8 | 35.2 | 12.7 | 43.5 |
| $CH_4$ | 0 | 0 | 0 | 1.7 | 3.7 | 6.0 | 4.2 |
| $C_2H_2$ | 1.8 | 2.1 | 2.1 | 2.1 | 2.1 | 2.1 | 2.4 |
| $C_2H_4$ | 31.6 | 31.6 | 31.6 | 31.6 | 31.6 | 31.6 | 35.7 |
| $C_2H_6$ | 2.2 | 2.2 | 2.2 | 2.2 | 2.2 | 2.2 | 2.4 |
| $C_3H_4$ | 1.1 | 1.1 | 1.1 | 1.1 | 1.1 | 1.1 | 1.2 |
| $C_3H_6$ | 9.2 | 9.2 | 9.2 | 9.2 | 9.2 | 9.2 | 10.4 |
| $C_3H_8$ | 0.4 | 0.4 | 0.4 | 0.4 | 0.4 | 0.4 | 0.4 |
| $C_4H_4$ | 0.3 | 0.3 | 0.3 | 0.3 | 0.3 | 0.3 | 0.3 |
| $C_4H_6$ | 4.6 | 4.6 | 4.6 | 4.6 | 4.6 | 4.6 | 5.2 |
| $C_4H_8$ | 0.4 | 0.4 | 0.4 | 0.4 | 0.4 | 0.4 | 0.4 |
| Total | 55.9 | 90.2 | 93.1 | 117.5 | 94.8 | 72.9 | 109.6 |
| Syn-gas lbs | 4.3 | 38.3 | 41.2 | 63.9 | 39.1 | 15.0 | 47.0 |
| Mole Ratio $H_2$/CO | 4.38 | 2.05 | 1.63 | 1.21 | 1.59 | 2.53 | 1.13 |
| Fuel Feed/$O_2$ lbs Ratio | .278 | .430 | .493 | .600 | .529 | .404 | .514 |
| $O_2$/Fuel lbs Ratio | 3.60 | 2.32 | 2.03 | 1.67 | 1.89 | 2.48 | 1.94 |

The following TABLE VII sets forth a typical assay of tar for the process, regardless of which of the feedstocks is employed.

TABLE VII

| Crude Source | A or B |
|---|---|
| Boiling Range, ° C | 270–350° |
| C/H | 13.35 |
| C, Wt % | 90.6 |
| H, Wt % | 6.8 |
| S, Wt % | 2.6 |

What is claimed is:

1. An integrated partial oxidation-thermal cracking process of increased yield for the utilization of all fractions of crude oil feedstocks in the concurrent production of synthesis gas and an olefin rich stream comprising the steps of:
   (a) separating, by distillation, a crude oil feedstock stream into distillate and asphaltic streams;
   (b) burning, at a temperature of about 1800°–2200° C., streams of fluid fuel and oxygen having a weight ratio of about 0.4–0.8 to 1 in the presence of superheated steam to form a reducing stream of hot combustion products;
   (c) passing said asphaltic stream as fuel to said burning step (b);
   (d) injecting a crude oil distillate fraction stream into said reducing stream of hot combustion products;
   (e) passing the resulting injected stream through a velocity accelerating zone to a reaction zone maintained at an exit temperature of about 800°–1000° C. and a pressure of about 10–150 psig for 5–50 milliseconds to effect thermal cracking of said crude oil distillate fraction stream to a stream containing stream and reaction products;
   (f) thermally quenching said steam and reaction products stream;
   (g) removing pitch from said stream and fractionating the resulting stream to provide at least one stream of hydrocarbon oil and an olefin rich gas stream;
   (h) recycling fractions of said hydrocarbon oil as fuel to said burning step (b);
   (i) separating carbon dioxide and any contained hydrogen sulfide from said olefin rich gas stream;
   (j) separating streams of synthesis gas, methane and ethylene from said olefin rich gas stream; and
   (k) recycling said methane stream as fuel to said burning step (b).

2. The process in accordance with claim 1, wherein said burning step (b) is carried out at a temperature of about 2100° C.

3. The process in accordance with claim 1, wherein said reaction zone is maintained at an exit temperature of about 900° C.

4. The process in accordance with claim 1, wherein said pressure in said reaction zone is maintained at about 40 psig.

5. The process in accordance with claim 1, wherein the time for passing said injected stream through said velocity accelerating zone and reaction zone is from about 10–20 milliseconds.

* * * * *

UNITED STATES PATENT OFFICE
CERTIFICATE OF CORRECTION

Patent No. 4,134,824               Dated January 16, 1979

Inventor(s) Gerard R. Kamm and Kazuo Tanaami

It is certified that error appears in the above-identified patent and that said Letters Patent are hereby corrected as shown below:

In Column 3, line 2 "steam" should read --stream--.

In Column 4, line 57 (Table I) "0.237" should read --0.273--.

In Column 8, line 31 "stream" should read --steam--.

Signed and Sealed this

Eighth Day of May 1979

[SEAL]

Attest:

RUTH C. MASON
Attesting Officer

DONALD W. BANNER
Commissioner of Patents and Trademarks